US007221405B2

(12) United States Patent
Basson et al.

(10) Patent No.: US 7,221,405 B2
(45) Date of Patent: May 22, 2007

(54) UNIVERSAL CLOSED CAPTION PORTABLE RECEIVER

(75) Inventors: Sara H. Basson, White Plains, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 09/774,930

(22) Filed: Jan. 31, 2001

(65) Prior Publication Data

US 2002/0101537 A1    Aug. 1, 2002

(51) Int. Cl.
*H04N 7/00* (2006.01)
*H04N 11/00* (2006.01)

(52) U.S. Cl. ............... 348/468; 348/563; 348/725; 345/7; 345/8

(58) Field of Classification Search ........... 348/468, 348/115, 725, 731, 563, 553, 552; 345/7–9
See application file for complete search history.

(56) References Cited

U.S. PATENT DOCUMENTS

| 5,506,626 A | 4/1996 | Yagi et al. |
| 5,537,151 A | 7/1996 | Orr et al. |
| 5,543,851 A * | 8/1996 | Chang ............... 348/468 |
| 5,648,789 A * | 7/1997 | Beadles et al. ........ 345/8 |

(Continued)

FOREIGN PATENT DOCUMENTS

DE    4435565    * 10/1994

OTHER PUBLICATIONS

U.S. Appl. No. 09/774,925, filed Jan. 31, 2001, Basson et al. entitled "Wearable Display System with Indicators of Speakers."

(Continued)

*Primary Examiner*—Michael H. Lee
(74) *Attorney, Agent, or Firm*—Anne V. Dougherty; Ryan, Mason & Lewis, LLP

(57) ABSTRACT

Methods and apparatus for portable and universal receipt of closed captioning services by a user are provided in accordance with the invention. The invention permits a user to receive closed captioning services wherever he or she may be viewing video content with an audio component in accordance with a video/audio content display system (e.g., television set, computer monitor, movie theater), regardless of whether the content display system provides closed captioning capabilities. Also, the invention permits a user to receive closed captioning services independent of the video/audio content display system that they are using to view the video content. In one illustrative aspect of the present invention, a portable and universal closed caption receiving device (closed caption receiver) is provided for: (i) receiving a signal, which includes closed captions, from a closed caption provider while the user watches a program on a video/audio content display system; (ii) extracting the closed captions; and (iii) providing the closed captions to a head mounted display for presentation to the user so that the user may view the program and, at the same time, view the closed captions in synchronization with the video content of the program.

50 Claims, 6 Drawing Sheets

U.S. PATENT DOCUMENTS

| | | | |
|---|---|---|---|
| 5,649,060 | A | 7/1997 | Ellozy et al. |
| 5,657,088 | A | 8/1997 | Hankinson |
| 5,946,046 | A * | 8/1999 | You et al. .................. 348/468 |
| 6,005,536 | A * | 12/1999 | Beadles et al. ............... 345/7 |
| D436,960 | S | 1/2001 | Budd et al. |
| 6,222,677 | B1 | 4/2001 | Budd et al. |
| 6,456,331 | B2 * | 9/2002 | Kwoh ....................... 348/465 |

OTHER PUBLICATIONS

U.S. Appl. No. 09/437,793, filed Nov. 10, 1999, Budd et al. entitled "Compact Illumination System Providing Improved Field of View for Virtual Display Applications."

U.S. Appl. No. 09/108,544, filed Jul. 1, 1998, Kanevsky et al. entitled "Audio/Video Archive System and Method for Automatic Indexing and Searching."

* cited by examiner

UNIVERSAL CLOSED CAPTION PORTABLE RECEIVER

CROSS REFERENCE TO RELATED APPLICATIONS

This application is related to the U.S. patent application identified by attorney docket no. YOR920000740US1, entitled "Wearable Display System with Indicators of Speakers," filed concurrently herewith, and the disclosure of which is incorporated by reference herein.

FIELD OF THE INVENTION

The invention is generally related to techniques for improving translation and/or transcription services for the hearing impaired and, more particularly, to methods and apparatus capable of portably and universally receiving closed captioning services.

BACKGROUND OF THE INVENTION

Closed captioning (CC) integrated circuits or chips exist in many television sets. This chip allows for receipt and decoding of a text-based signal transmitted in association with the transmission of a television signal representing a movie or other television program. The text is intended to be a verbatim representation of the audio content of the program, e.g., what a person in the program is currently saying. One reason such text is used is so that individuals with a hearing impairment have a visual means of receiving the audio content of the televised program.

However, there are many situations when there is no closed captioning service provided on a television. For instance, there may be public and/or private areas where the chip may not be activated, for example, in a fitness club that has television sets for their customers, or a host's house that has not activated a chip although guests may be present that require it. A guest may also not feel comfortable asking a host to activate the closed captioning chip. For these reasons, a televised program that may otherwise have closed captioning service associated therewith, may still not be presented with closed captions.

There are also many other devices for presenting video/audio content that have no means to display closed captions. Computer monitors, for instance, may play a movie or a segment from a news brief (e.g., either from a downloaded feed or from a compact disc or digital video disc), but will often not have the ability to display closed captions. A movie theater display system is another example of one that typically has no ability to display closed captions.

It is to be appreciated that closed captioning services are necessary not only for the hearing impaired population but for foreigners and people who speak a different native tongue. People who speak another language may require closed captions because it will allow a movie, show, or news brief to be translated into their native tongue.

U.S. Pat. No. 5,537,151 issued Jul. 16, 1996 to Orr et al. and entitled "Closed Caption Support with Timewarp," the disclosure of which is incorporated by reference herein, discloses a method of providing closed captioned data to a television viewer which includes: detecting closed captioned data signals transmitted in conjunction with a television signal; decoding the data signals to caption display signals; and displaying the caption display signals on an auxiliary screen separate from a screen displaying the television signals. As stated therein, the Orr et al. method is an attempt to avoid the problem associated with closed caption text obstructing a portion of the video displayed on a television screen. However, while Orr et al. discloses use of an auxiliary screen, the computer which drives the auxiliary screen is tasked with extracting the closed caption portion from the television signal, processing the video signal portion, and sending the processed video signal to the television display. The auxiliary screen is placed near the television display. However, one problem with this arrangement is that the closed caption extractor does not operate independently from, or autonomously with respect to, the television. Another problem is that the auxiliary display is not portable.

Accordingly, there is a need for methods and apparatus which are capable of portably and universally receiving closed captioning services regardless of whether a display device presenting a particular program is capable of, or activated to, display closed captions.

SUMMARY OF THE INVENTION

The present invention provides methods and apparatus for portable and universal receipt of closed captioning services by a user. It is to be appreciated that, as used herein with respect to the invention, the term "portable" generally means that the methods and apparatus of the invention permit a user to carry (e.g., wear) a device for receiving closed captioning services wherever he or she may be viewing video content with an audio component in accordance with a video/audio content display system. The portability of such a device is also benefited by the fact that the device need not be operably connected to the content display system. Further, as used herein with respect to the invention, the term "universal" generally means that the methods and apparatus of the invention permit a user to receive closed captioning services independent of (autonomously with respect to) the video/audio content display system that they are using to view the video content. The universal nature of such an inventive device also allows for the transcription of all forms of media, e.g. television, plays in theaters, movies, etc.

In one illustrative aspect, the present invention provides a method of processing a signal wherein at least a portion of the signal includes one or more closed captions representing audio content associated with a program whose visual content is being viewed by a user, the method comprising the steps of: (i) obtaining, from a source, the signal including the one or more closed captions in a portable processing device; (ii) processing the signal in the portable processing device so as to generate a display signal representative of the one or more closed captions in the obtained signal; and (iii) providing the display signal from the portable processing device to a portable display, operatively coupled to the device, for presentation to the user so that the user may view the visual content of the program and view the one or more closed captions in accordance with the portable display. In an embodiment where the visual content of the program is presented on a content display system, it is to be appreciated that the portable processing device and the portable display are independent of the content display system.

In another illustrative aspect, the present invention provides a portable and universal closed caption receiving device (closed caption receiver) for receiving a signal, which includes closed captions, directly from a closed caption translator while the user watches a program on a video/audio content display system such as, for example, a television set. The closed caption translator is preferably the same service that normally provides a closed caption signal in conjunction with the broadcast television signal. The translator services corresponding to the television program are preferably wirelessly received by the closed caption receiving device. It is to be understood that the television set may not have closed caption processing capabilities or may have closed caption processing capabilities which are not activated in the television set. The closed caption receiving device extracts the closed captions and provides them to a separate display system also carried by the user in some manner.

The separate display system carried by the user may preferably be a wearable head mounted display such as, for example, one that may be mountable in association with a pair of conventional eyeglasses. However, it is to be understood that a variety of known wearable head mounted displays may be employed according to the invention to present the received closed captions to the user. Some illustrative embodiments will be discussed below in the detailed description. In any case, in accordance with the invention, a head mounted display provides a very comfortable way to look at an object, e.g., the display screen displaying a particular program, while viewing the closed captions displayed in accordance with the head mounted display.

Accordingly, with a closed caption receiving device according to the invention, a person may come to a place where a program is being broadcasted on television without closed captioning services. The person may then set the device to the same channel as the program being broadcasted and see closed captions associated with the audio content of the program on the local wearable display system. Preferably, rather then transmitting all the broadcast information, the receiving device transmits only the closed captions for display on the local wearable display system. Thus, the user is able to simultaneously look at the television screen while reading the closed captions. However, it is to be appreciated that content other than the closed captions may be extracted and displayed on the local wearable display system, if so desired.

In yet another illustrative aspect, the present invention provides a portable and universal closed caption receiving device for receiving a signal including closed captions from a transcription service while the user views a program on a video/audio content display system in which no closed captioning capability is available such as, for example, one that may be associated with a personal computer or a movie theater. Again, in this case, the closed caption receiving device is used in conjunction with a separate display system carried by the user such as, for example, a wearable head mounted display. The closed captioning device receives the transcription services including closed captions from the transcription service provider while the user watches a movie or some other program in a theater or on a computer (e.g., a digital video disc) in which no closed captioning capability is available. In accordance with the invention, when a person sees that there is a movie being displayed on a computer screen or in a movie theater, the person may contact the transcription service and request a transcription of the program by name. The transcription service transmits the closed captions synchronously with events in the program. Several methods may be employed to synchronize the closed caption with the events in the program. For example, an operator associated with the service may be able to listen to the dialogue from the program so as to ensure that the transcription coincides with the program. Again, the closed captions, themselves, may be transmitted through a wireless network to the receiving device which then provides them to the user's wireless wearable head mounted display. Of course, the connection may be hardwired. In any case, this allows the person to look at the computer or theater screen through the wearable display and see the program while reading the captions on the wearable display comfortably.

It is to be appreciated that a stenographic service may be used in conjunction with the invention to type what is being broadcasted or shown in those cases when closed captioning is not readily available, e.g., live broadcasts. Thus, for instance, rather than requesting a prestored transcription, the user may request a real-time stenographic transcription of a live program.

It is to be understood that generation of the closed captions that are processed and displayed in accordance with the present invention may be accomplished in a variety of ways. While some examples are provided below, it is to be understood that one of ordinary skill in the art will realize other generation methods given the inventive teachings herein. As mentioned above, the closed captions may be generated by a stenographic service. The closed captions may also be obtained through automatic speech recognition (ASR) techniques. ASR transcription may be performed directly on the closed caption receiving device or at some remote location with which the device is in communication. The closed captions may also be provided by a combination of human/ASR transcription, e.g., an operator hears the speech (over the telephone) and repeats it to the ASR system which transcribes the operator's speech. Also, the transcriptions may be prepared in advance of the event (e.g., before a television show, play or movie) and then sent to the closed caption receiving device at the time of the event.

Also, in a case where the transcription has already been generated (e.g., by a human operator and/or automatically) and stored, the transcription may be aligned in real-time using the received audio content of the program or using time synchronization (i.e., a text is displayed in accordance with the timing of the playing of the program).

Still further, translation services may be performed via humans, via machine translation plus ASR, and via combinations thereof.

It is to be further appreciated that a person who understands a language other than the language of the audio content of the particular program being viewed may use a closed caption receiving device of the invention in, for example, a movie theater or at home, after making a telephone call to the service requesting a translation for the closed captions into the language that he or she understands. It is to be further appreciated that the present invention finds particular applicability in multi-lingual nations such as Switzerland where there may be a need to translate the captions of a program into three or four languages such as English, French, German, and Swiss.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described below in the context of exemplary video/audio content display environments where closed captioning services may be received according to the invention, e.g., use in accordance with a television set, a personal computer, and a movie theater. However, it is to be understood that the invention is not limited to use in any particular content display environment, but is rather more generally applicable for use in accordance with any content display environment in which it is desirable to be able to portably and universally receive closed captioning services.

Figure 1:
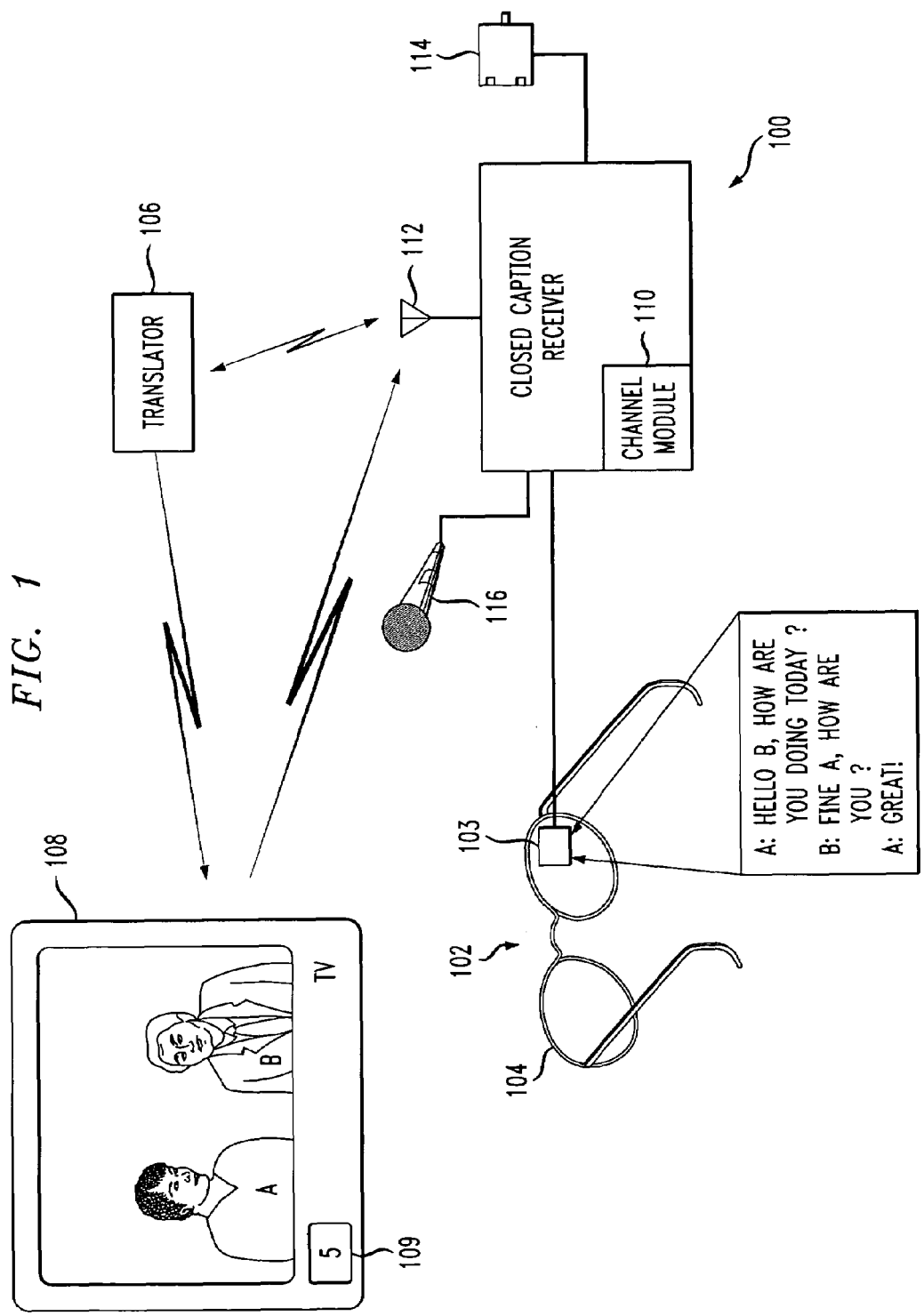
FIG. 1 is a block diagram illustrating a first embodiment of a closed caption receiving device and associated environment according to the present invention.

Referring initially to FIG. 1, a block diagram illustrates a first embodiment of a closed caption receiving device and associated environment according to the present invention. As shown, a portable and universal closed caption receiving device or receiver 100 operates in conjunction with a head mounted display system 102 coupled thereto. As illustrated, the head mounted display system 102 comprises a microdisplay 103 mounted on a pair of eyeglasses 104. While a user is not expressly shown, it is to be understood that the user wears the eyeglasses on his or her face in a normal manner and also preferably carries the receiver 100 on his or her body, e.g., attaches the receiver to a waist belt.

It is to be appreciated that the invention is not limited to use with any particular head mounted display system but is more generally applicable to use with any separate display system that may be carried by the user. For instance, the eyeglass-based microdisplay system 102 generally depicted in the figures is available from MicroOptical Corporation (Westwood, Mass.). However, a wide variety of other head mounted display systems may be used, e.g., the ergonomic wearable personal display from Invisio Inc. (Sunnydale, Calif.); and the compact optical display system associated with the wearable personal computer from IBM Corporation (Armonk, N.Y.) as described, for example, in U.S. patent applications identified by Ser. No. 09/437,972 filed Nov. 10, 1999; Ser. No. 09/437,793 filed on Nov. 10, 1999; and/or Ser. No. 29/110,706 filed on Sep. 10, 1999, assigned to the present assignee and incorporated by reference herein. It is to be understood that the microdisplay system may employ a microprojector for projecting the closed caption text onto the lens of the user's eyeglasses or the text may be displayed on a screen associated with the microdisplay system. Given the teachings herein, one of ordinary skill in the art will realize various other wearable display systems that may be employed in conjunction with the closed caption receiver of the present invention.

Further, as shown in FIG. 1, the closed caption receiver 100 and head mounted display system 102 are deployed in an environment including a translator 106 and a television set 108.

The translator module 106 represents a translator service that generates and transmits closed caption broadcasts for radio and television stations. That is, the translator service 106 is the service that provides closed captions in association with broadcasted television signals. For example, the translator 106 may generate closed captions in accordance with the North American closed captioning standard originally proposed by The Closed Captioning Association and the Public Broadcasting System (PBS). The standard is defined by the Federal Communication Commission (FCC) in FCC document FCC-91-119 and in the FCC Federal Register Vol. 56 No 114, the disclosure of which is incorporated by reference herein. However, any conventional closed caption translator service may be employed. It is to be understood that the use of the term "translation" in the context of the translator 106 is not intended to be limited to a foreign language translation but rather is intended to more generally refer to a translation of any audio content into closed captions according to some standard (e.g., as defined by FCC). However, as mentioned herein, the invention provides benefits to a person from a foreign country in that the text of the closed captions may in fact be translated into a language that the person understands before being transmitted.

It is to be understood that the television set 108 either has no closed caption processing capabilities, or has closed caption processing capabilities which are not activated in the television set. Thus, absent the present invention, the user would have no means of receiving closed captioning services for the program being viewed on the television set 108. It is to be appreciated that block 108 could also represent some other video/audio content display system such as, for example, a computer display. In the case of a television set, block 109 represents the particular channel of the transmission being viewed, e.g., channel 5.

As shown, the head mounted display system 102 is connected to the closed caption receiving device 100. The connection may be hardwired or wireless. The receiving device 100 receives from the translator 106 the same closed caption data that would ordinarily be input into the television 108. Again, while a wireless connection is shown between the translator 106 and the receiver 100, a hardwired connection may be employed. However, due to the portability of the receiver, a wireless connection is preferred.

Referring specifically to the receiving device 100 as shown in FIG. 1, the device includes various functional subcomponents which will now be explained. A more detailed description of the receiving unit will be provided below in the context of FIG. 4.

Channel module 110 denotes the portion of the receiving device 100 that controls the channel to which the device 100 is tuned. The channel that this module specifies should correspond with the channel that the television set 108 is tuned to, e.g., channel 5 (block 109).

Element 112 represents a miniature antenna connected to the closed caption receiving device 100. The antenna 112 provides the mechanism to allow the receiver to wirelessly communicate with the translator service. It is to be understood that the translator 106 has comparable equipment for wirelessly communicating with the receiver 100. The particular wireless communication protocol employed by the translator and the receiver is not critical to the invention.

Control module 114 represents a handheld controller connected to the closed caption receiving device 100 that allows a person to choose a channel, turn the device on or off and control the general operating directives associated with the device. One of ordinary skill in the art will appreciate that a wide variety of handheld controller designs may be employed. For example, the controller 114 may be a small mouse type device that contains a tracking mechanism (e.g., similar to those in IBM ThinkPads or comparable processing devices). In one embodiment, the controller 114 may perform similar to a controller associated with a television. For example, the controller 114 preferably has buttons with numbers. Thus, when the user determines which channel is being shown on the television 108 (e.g., by looking at the channel module 109 on the television), the user can then press the button on the controller 114 with the corresponding number to activate that channel. Such activation is recorded in channel module 110 and the receiver is effectively tuned to receive closed captions corresponding to the program being shown on that channel. Further, the controller may have an arrow buttons (marked '+' for channel up and '−' for channel down) to move across channels via single steps.

In yet another embodiment, a virtual controller (similar in layout to the handheld controller 114) may be displayed on the head mounted display system 102 with a tracking pointer whose movement is controlled by the controller 114 (like a mouse controls a cursor on a personal computer display). With such an arrangement, the receiver displays the virtual controller on the head mounted display, and the user moves the tracking pointer (e.g., cursor arrow) to a button on the virtual controller. Once the arrow is over the desired button, clicking on a select button on the controller 114 activates the function associated with the virtual button, e.g., selecting channel 5.

In addition to, or as an alternative to, the closed caption receiving device 100 may be controlled by spoken commands provided by the user. In such case, as shown, the receiving device includes a microphone 116 for inputting the user voice commands. Although not expressly shown, the receiver includes a speech recognition engine for decoding the spoken utterances and converting them into control signals inside the receiver for effectuating the spoken directives. Such a speech recognition engine may also be used to recognize and generate the closed captions to be displayed on the head mounted display 102.

Thus, as illustrated on the screen of the television set 108, a program is broadcast with two individuals 'A' and 'B' talking to one another. The program is broadcast in association with channel 5. In accordance with the invention, the user instructs the receiver 100 (i.e., via the handheld controller 114 and/or microphone 116) to tune to channel 5 so as to pick up the closed caption signal broadcast by the translator 106 that is associated with channel 5. The receiver 100 receives the closed caption signal, extracts the closed captions associated with the program, and provides them to the head mounted display system 102. The display system 102 presents the closed captions to the user while he views the program on the television set 108. In the case of the eyeglass-based display system, the display 103 projects an output image of the closed captions that reflects on the eyeglasses 102. As shown, in the exploded view in FIG. 1, the audio content of the program, i.e., the dialogue between 'A' and 'B,' is textually presented to the user.

In another embodiment, if a closed caption signal is provided to the television 108 but is not seen by the user because, e.g., there is no closed caption chip in the television or the television owner did not activate the chip, then the television may be adapted to redirect (wirelessly or otherwise) the closed caption transcription received from the translator 106 by the television directly to the closed caption receiving device 100. Thus, the closed caption receiver 100 could then receive the closed caption signal from either the translator or the television set.

Figure 2:
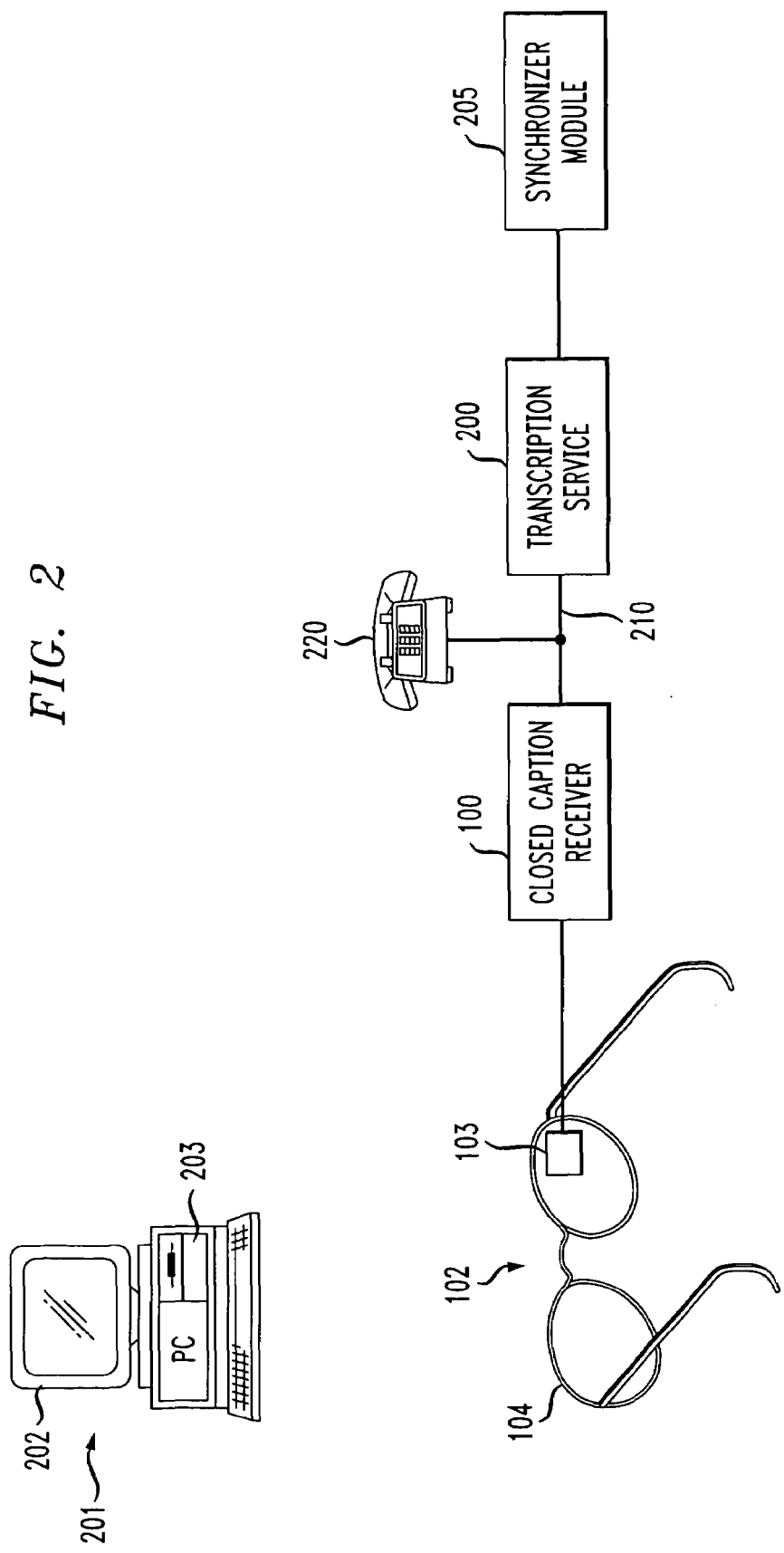
FIG. 2 is a block diagram illustrating a second embodiment of a closed caption receiving device and associated environment according to the present invention.

Referring now to FIG. 2, a block diagram illustrates a second embodiment of a closed caption receiving device and associated environment according to the present invention. As shown in accordance with FIG. 2, instead of the environment including a television set, a personal computer (PC) 201 is used as an example. The computer includes a monitor 202 and a device 203, e.g., a a CD-ROM or DVD (e.g., a digital video disc) player, that enables the computer to play a movie or other program on the monitor 202. As previously mentioned, computers often do not have closed captioning capabilities. Again, as in FIG. 1, the closed caption receiving device is generally illustrated as block 100, while the head mounted display system is generally illustrated as element 102 (including display 103 and glasses 104).

In this embodiment, the receiver 100 is connected to a telephone channel 210 to which a telephone 220 is also connected. The telephone 220 and receiver 100 are connected with a transcription service 200 via the telephone channel 210. The transcription service 200 provides a signal representing a textual transcription, i.e., closed captions, of the audio content of the program being viewed by the user on the computer monitor 202 to the receiver 100 via the telephone channel 210.

How the transcription is requested and how the transcription provider 200 ensures that the transcription is synchronized with the program being viewed on the PC (i.e., that the transcribed audio content corresponds with the video content) will now be explained. In accordance with the invention, when a person sees that there is a movie being displayed on the computer screen, the person may call up the transcription service 200 using the phone 220 (or using a separate phone line) and requests a transcription of the program, for example, by name. Other mechanisms, manual and/or automatic, for determining the movie being viewed may be employed. The transcription service 200 locates the prestored transcription and transmits the closed captions via the telephone line synchronously with events in the program. Of course, it is to be appreciated that communication between the receiver 100 and the transcription service 200 may alternatively be wireless.

In any case, several methods may be employed to synchronize the closed caption with the events in the program. For example, an operator associated with the service may be able to listen to the dialogue from the movie, e.g., via the open phone line between the user and the service on phone 220, so as to ensure that the transcription coincides with the program. This would assume that the audio content of the movie is being output on a speaker (not shown) associated with the computer 201. As shown in FIG. 2, the transcription service is connected with a synchronizer 205 that automatically or with the help of an operator associated with the transcription service, sends the beginning of the captioning for the movie when the movie starts. If the movie is interrupted, stopped, or for some reason, not in sync with the captioning, it is possible to again call the transcription service and reactivate the synchronization module 205, otherwise synchronization need only occur once. After the movie has begun the captions are displayed in conjunction with the scenes of the movie because, it is assumed, they have been arranged at the correct intervals prior to the given showing of a particular movie.

The synchronization service task performed by the synchronizer module 205 sends a transcription in accordance with the audio that is generated at the user location. The synchronization service works mainly with texts that were transcribed and prepared in advance, although that is not required. There are several ways in which this may be achieved. Such illustrative ways may be understood through examples.

Consider the situation in which the system is deployed in a theater in which a play is being performed. It is assumed that the transcription service already has transcripts of what actors say in a play. If the transcription service is provided by a human operator, the operator listens to the actors lines in the play and releases appropriate transcribed lines to the receiver 100. If the actor changes the lines, the operator may skip parts of the transcription or type/write manually what was being spoken. This service can be automated. For example, the transcription service 200 and synchronizer 205 may employ automatic speech recognition (ASR). In such an embodiment, the ASR engine decodes the real-time speech of the actors, finds the appropriate segment in the previously transcribed text, and sends the appropriate segment.

Consider the situation in which the system is deployed in a movie theater in which a movie is being shown. Because movie audio will not change since it is prerecorded, text can be displayed in sync with the movie just by ensuring that the closed captions start at the same time as the movie. Thus, listening for the start of the movie, the operator need only find where to start the transcription (by fastforwarding or rewinding the transcription by a determined offset) and then start the prepared transcript at the point that corresponds to the movie. After the operator initiates the transcript processing at the correct point, the transcript is displayed by the receiver at a predetermined speed which corresponds with the speed of audio content delivery of the movie. At this point, the operator does not need to participate any longer. However, if the movie was stopped and started again, the user can call the operator and ask him to start the transcription from the correct place again. This transcription synchronism process also can be accomplished automatically using ASR detection, as explained above.

Figure 3:
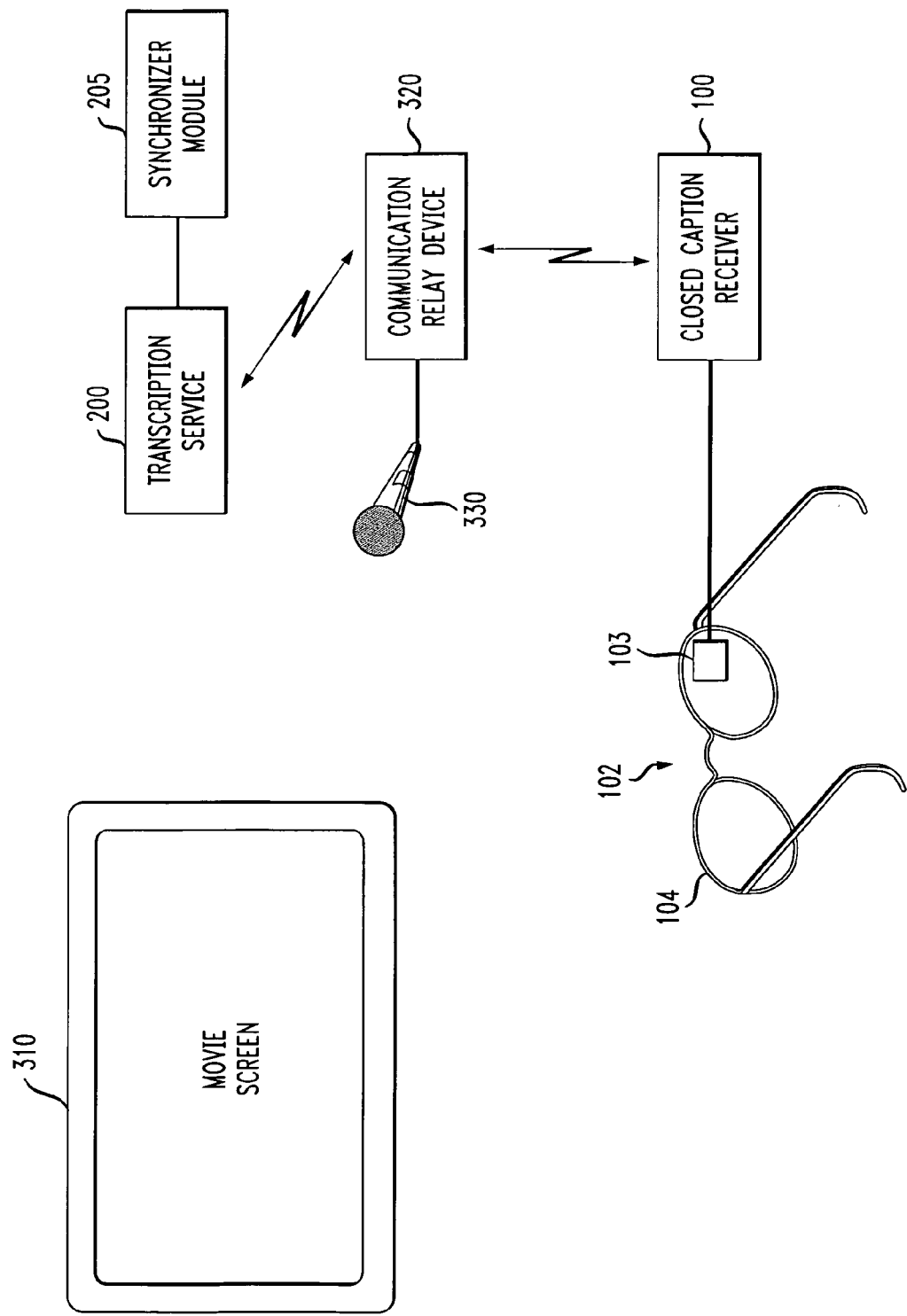
FIG. 3 is a block diagram illustrating a third embodiment of a closed caption receiving device and associated environment according to the present invention.

Referring now to FIG. 3, a block diagram illustrates a third embodiment of a closed caption receiving device and associated environment according to the present invention. Particularly, FIG. 3 explains how a closed caption receiving device of the invention would operate in a movie theater. As shown, block 310 represents a movie theater screen. Again, as in FIG. 1, the closed caption receiving device is generally illustrated as block 100, while the head mounted display system is generally illustrated as element 102 (including display 103 and glasses 104). Also, as in FIG. 2, the transcription service and synchronizer are respectively represented as blocks 200 and 205.

In this embodiment, the receiver 100 wirelessly communicates with a communication relay device 320. The relay device 320 includes a microphone 330 and is preferably located in the movie theater, or at least in the vicinity of the audio system outputting the audio content of the movie. It is to be appreciated that the overall concept here is similar to that shown in FIG. 2, i.e., the transcription service transmits closed captions to the receiver 100 for synchronous presentation on display system 102. However, the manner of how the transcription is requested and how the transcription provider 200 ensures that the transcription is synchronized with the program being viewed on the movie screen 310 is different, as will now be explained.

Since the time at which a movie at a movie theater begins is generally set based on the movie theater's published timetable, the transcription service will generally be prepared to provide the transcription at close to the appropriate time. This is to be contrasted with a DVD being played on a home PC, which can be started and stopped at any time. Nonetheless, a mechanism for precisely synchronizing the closed captions must still be provided in the movie theater situation. To this end, the invention provides the communication relay device 320 with associated microphone 330. The relay device 320 picks up the audio content of the movie via the microphone 330 and wirelessly transmits the audio content to the transcription service 200 and the synchronization module 205 so as to enable the transcription to be wirelessly transmitted to the receiver 100, via relay device 320, in synchronization with the video content of the movie. This may be similar to the transcription operator listening over the telephone in FIG. 2.

It is also to be appreciated that while the exemplary transcription services described above have referred to prestored transcriptions, the invention is not so limited. For example, it is to be appreciated that a stenographic service may be used in conjunction with the invention to type what is being broadcasted or shown in those cases when closed captioning is not readily available, e.g., live broadcasts. Thus, for instance, rather than requesting a prestored transcription, the user may request a real-time stenographic transcription of a live program from the transcription service 200.

By way of further example, it is to be appreciated that a person who understands a language other than the language of the audio content of the particular program being viewed may use a closed caption receiving device. In this case, the user would receive a translation of the closed captions into the language that he or she understands. This invention would thus find particular applicability in multi-lingual nations such as Switzerland where there may be a need to translate captions of a program into three or four languages such as English, French, German, and Swiss.

While FIGS. 2 and 3 illustrate the transcription service being remote from the CC receiver 100, it is to be understood that when implemented as an automatic speech recognition (ASR) system, the functions of the transcription service may reside on the CC receiver itself. That is, using microphone 116, the receiver could input the audio content of the program from the content display system, recognize the input audio stream using an ASR system implemented on the receiver, and generate a textual transcription of the audio content. This transcription could then be displayed on the user's head mounted display.

Figure 4:
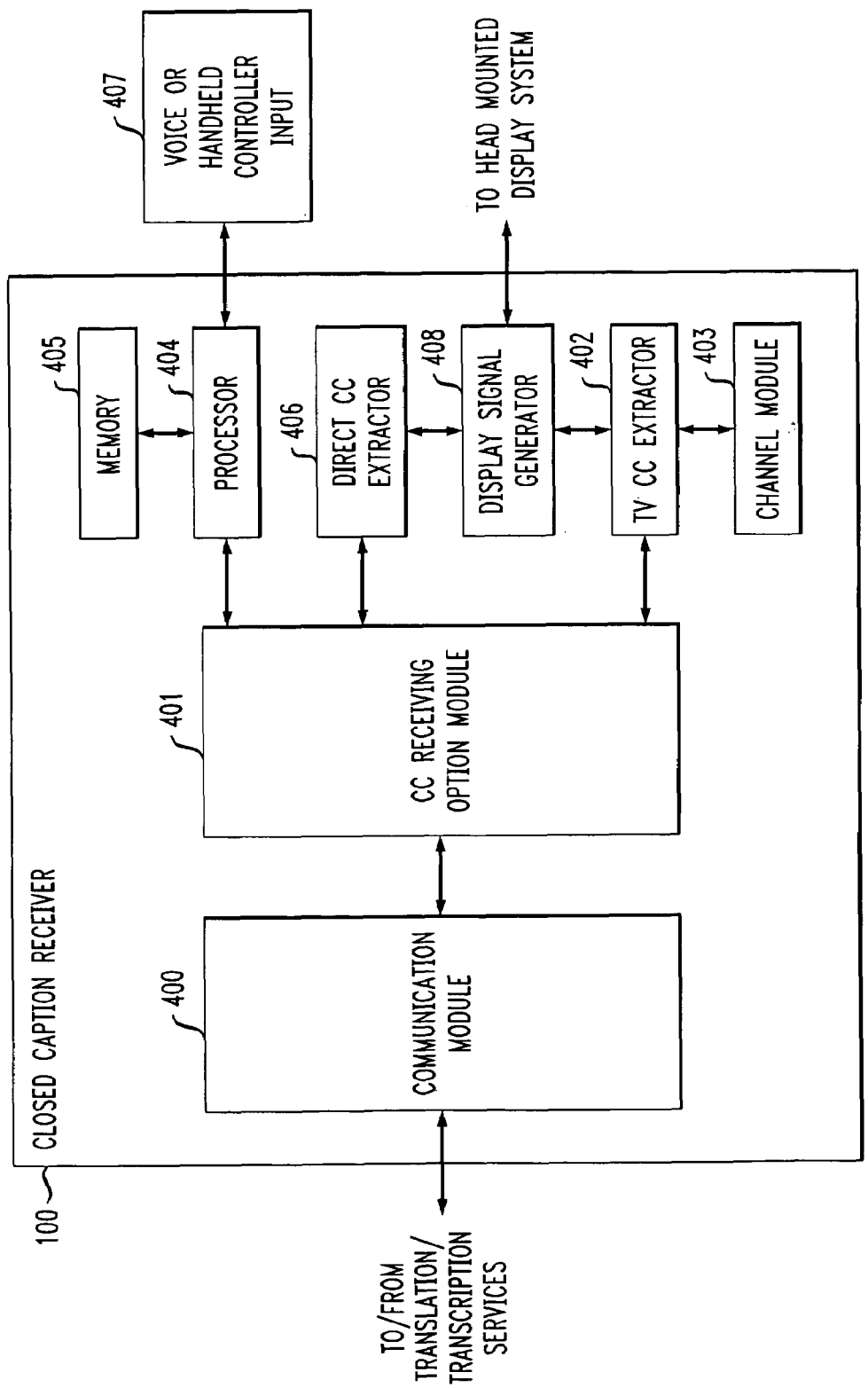
FIG. 4 is a block diagram illustrating a more detailed embodiment of a closed caption receiving device according to the present invention.

Referring now to FIG. 4, a block diagram illustrates a more detailed embodiment of a closed caption receiving device according to the present invention. As shown, the closed caption receiving device 100 comprises a communication module 400, a closed caption (CC) receiving option module 401, a television CC extractor 402, a channel module 403, a processor 404, memory 405, a direct CC extractor 406, a voice/handheld controller input module 407, and a display signal generator 408.

The communication module 400 provides for hardwired and/or wireless communication with a translation or transcription service through any suitable communication means, e.g., a LAN (local area network), a regular phone line, wireless phone line, Internet, or radio. The communication module 400 generally represents the communication interface for the receiver 100 and depends on the communication protocol used by the receiver. In a wireless embodiment, the antenna 112 shown in FIG. 1 is operatively coupled to the communication module 400. Of course, depending on the connectivity of the particular implementation, the communication module 400 may provide interfaces for a telephone line, a local area network, a wide area network, etc.

The communication module 400 is connected to a closed caption receiving option module 401. The receiving option module is connected and controlled by a processor 404, which receives the voice and/or handheld controller input 407. The processor 404 is coupled to associated memory 405 and controls the overall operations of the receiver 100. The input 407 represents the input commands provided by the user via either the handheld controller 114 (FIG. 1) or the microphone 116 (FIG. 1). The processor 404 decides which model the receiver 100 will use to extract closed captions from a signal received via the communication module 400. Whether the receiver 100 receives messages through a broadcast television signal or signal generated by a transcription service, which transcription service, address of the service, and what type of information is input is processed and/or determined in block 401. After receipt of this information, the closed caption receiving option module 401 chooses which module performs the extraction, i.e., TV CC extractor 402 or direct CC extractor 406.

Module 402, the TV closed caption extractor, is capable of extracting closed captions from a general bandwidth of information depending on which channel is chosen by channel module 403 (operated by the voice or handheld controller input 407). Channel module 403 corresponds to channel module 110 in FIG. 1. The TV extractor 402 is constructed similarly to a closed captioning chip found in television sets capable of closed captioning, as well as separate box devices that serve an identical function. Thus, the option module 401 (under control of the processor 404) provides the signal received from the communication module to the TV CC extractor 402 when the signal is determined to be a broadcast television signal (as may be transmitted by the translator 106 of FIG. 1) containing closed caption text. The TV CC extractor may implement any known algorithm for extracting closed captions from a broadcast television signal. For example, the extractor may implement closed caption extraction similar to that disclosed in the above-referenced U.S. Pat. No. 5,537,151 to Orr et al. Of course, as compared with the Orr et al. methodology, the TV CC extractor 402 of the receiver 100 of the invention is not required to process the video portion of the broadcast television signal and provide it to the television, rather it need only extract the closed caption signal from the television signal and provide it to the display signal generator 408. The display signal generator 408 generates a display signal, as is known in the art, that is provided to the head mounted display system 102 for presentation to the user wearing the display. Also, as previously mentioned, the Orr et al. auxiliary display for presenting closed captions to a user is not portable.

The CC extractor 406 is a direct closed captioning extractor that receives closed caption transmissions from a transcription service (as may be transmitted by the transcription service 200 of FIG. 2). The signal transmitted by the transcription service 200 is received by the communication module 400 in a manner consistent with the communication interface implemented therebetween (e.g., wireless, telephone, TV receiver, radio receiver). The option module 401 (under control of the processor 404) provides the signal received from the communication module to the direct CC extractor 406 when the signal is determined to be a signal transmitted by the transcription service 200 containing closed caption text. As illustrated above, the transcription service has several ways to receive voice data that should be transcribed (e.g., either the service listens to what is being spoken at the user location, or the service directly watches the same program that the user is viewing, etc.). The direct CC extractor 406 extracts the closed caption text from the received signal and provides it to the display signal generator 408. The display signal generator 408 generates a display signal, as is known in the art, that is provided to the head mounted display system 102 for presentation to the user wearing the display.

It is to be appreciated that the direct CC extractor 406 may employ closed caption extraction in a manner similar to the TV CC extractor 402. Alternatively, the extractors may employ other closed caption extraction methodologies known to those skilled in the art, e.g., U.S. Pat. No. 5,657,088 issued Aug. 12, 1997 to Hankinson and entitled "System and Method for Extracting Caption Teletext Information from a Video Signal;" or U.S. Pat. No. 5,506,626 issued Apr. 9, 1996 to Yagi et al. and entitled "Closed-caption Decoder Circuit Having Robust Synchronization Features," the disclosures of which are incorporated by reference herein.

Regarding the processor 404 and memory 405 of FIG. 4, while such a processor and memory is explicitly shown as receiving user input 407 and directly controlling the option selection module 401, it is to be appreciated that each of the functional blocks of FIG. 4 may be controlled by and/or implemented by processor 404 and memory 405 or one or more other such processor/memory arrangements.

Figure 5:
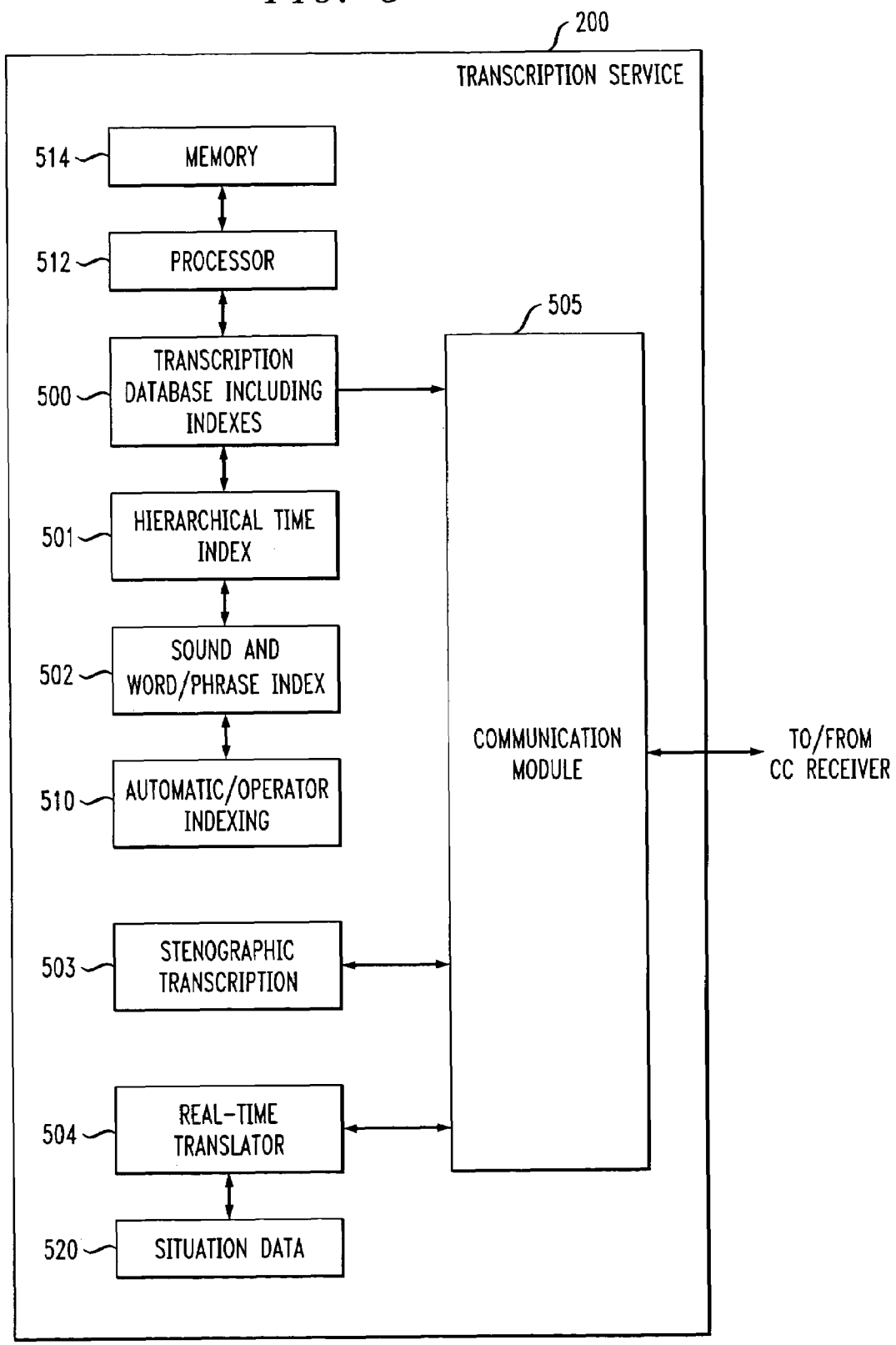
FIG. 5 is a block diagram illustrating a more detailed embodiment of a transcription service according to the present invention.

Referring now to FIG. 5, a block diagram illustrates a more detailed embodiment of a transcription service according to the present invention. Specifically, FIG. 5 describes the transcription service 200 noted in FIGS. 2 and 3. As shown, the transcription service system comprises a transcription database 500, a hierarchical time index 501, a sound and word/phrase index 502, a real-time translator 504, a communication module 505, an automatic operator indexing module 510, a processor 512, memory 514, and situation data 520.

The database 500 of transcriptions includes an index of all of the programs (e.g., movies) that are transcribed. The database is under the control of the processor 512 and memory 514. The processor 512 is coupled to associated memory 514 and controls the overall operations of the transcription service system 200. The processor/memory arrangement may also control the overall operations of the synchronizer module 205, although a separate processor/memory arrangement may be employed. Module 501 is a hierarchical time index which notes at which point in a program a certain captioned text should be displayed according to the time that the program has been playing. Module 502 represents a sound and word/phrase index which recognizes the point in a program that a certain captioned text should be displayed according to sounds, words and phrases from the movie that may be picked up by a local microphone and transmitted wirelessly or through another method, as described above. It is to be appreciated that sound indexing and automatic data indexing techniques as disclosed in U.S. patent application identified by Ser. No. 09/108,544 (attorney docket no. Y0998-120) filed on Jul. 1, 1998 and entitled "Audio/Video Archive and Method for Automatic Indexing and Searching;" and U.S. Pat. No. 5,649,060 issued on Jul. 15, 1997 and entitled "Automatic Indexing and Aligning of Audio and Text Using Speech Recognition," the disclosures of which are incorporated by reference herein. Module 510 represents automatic or operator-based indexing. That is, the transcribed data stored in database 500 may be processed in module 510 automatically (as when a transcribed portion of the text that corresponds to a given sound or time is displayed) or manually (as when the operator displays corresponding portions of the transcribed text). The transcription service may also contain a stenography service, as explained above, in order to transcribe those movies that have not yet been transcribed and for live transcription capabilities. Module 504 is a real-time translator that can function both automatically and with an operator for those cases when live transcription is needed.

Module 520 is part of module 504 and contains textual data that relates to a situation on a monitor or screen for people who are blind or have poor eyesight. Here, we consider the example of a service for sight impaired individuals. Rather than receiving closed caption transcription of the audio content of a program, a sight impaired person receives a description of the video content of the program. In other words, if there is some situation on TV or in a movie, the situation is described briefly via audio (e.g., "John entered the room"). Thus, the translation service 200 can be extended to provide a situation description for a sight impaired individual. In the case of a sight impaired individual, there is no need for a head mounted display. Instead, the receiver 100 may be connected to an earphone (not shown) worn by the user. Thus, the receiver 100 receives the situation description from the transcription service system 200, extracts the audio information using a known audio signal extractor, and provides the information to the earphone for audible presentation to the user.

Returning now to the other functional blocks of FIG. 5, transcription database 500 contains the transcriptions for all movies, plays and other kinds of programs and data which were generated at some previous time. The user contacts the transcription service (e.g., using one of several options: a telephone, e-mail, chat messenger, TDD (telephone device for deaf), etc.) to communicate with the transcription service using either external means (e.g., a telephone or PC that are in the room/building where the user is located) or means in his portable CC receiver 100 (e.g., communication module 400 of FIG. 4). If the user communicates via the module 400, then it is assumed that either there is a telephone interface mechanism in the communication module 400 (in order that the user could call the transcription service) or that there is an Internet interface mechanism in order that the user could send an e-mail message (or chat). The user provides the information about what should be transcribed (e.g., name of the movie, play, etc.), the time when the movie/play will start, and the means of access to the audio content of the movie/play (e.g., via telephone line 210 of FIG. 2 or microphone 330 of FIG. 3).

The transcription service system communicates with the user and receives audio data through the communication module 505 which communicates with the user communication module 400 (FIG. 4). If the transcription data is already stored in database 500, then index blocks 501 and 502 are used to process the data automatically in module 510. Otherwise, stenographic or other manual transcription is activated in accordance with module 510 may be employed. If a manual transcription is performed, the communication relay 320 (FIG. 3) is activated to obtain the audio content data from the user location through microphone 330 and send it to the transcription service 200. Such communication relay means can either be external to the closed caption receiver 100 (e.g., located in the theater where the movie is playing) or be a part of the receiver 100.

It is to be understood that the synchronization module 205 (FIG. 2) is connected to time and word/phrase indexes 501 and 502. The synchronization module uses this information to determine the correct point to begin the transcription, e.g., using the start time of the movie as provided in accordance with the hierarchical time index 501, using content spoken or sounds heard in the movie in accordance with sound and word/phrase index 502, or using information from both indexes. It is to be understood that the indexes 501 and 502 provide the appropriate pointers to the data stored in the transcription database 500.

It is also to be understood that after the transcription service transcribes something, it stores the transcription since the transcription may be used again, for instance, if the data is transmitted on television again, e.g., news information may be repeated by other stations. The stored content may be retrieved using indexes from index 502 (FIG. 5) which helps to identify whether the data was already transcribed.

It is to be further understood that the transcription in the form of closed captions, whether prestored or generated in real-time by a stenographer and/or automatic speech recognition, may be encoded by the communication module 505 into the signal transmitted to the CC receiver 100.

Regarding the processor 512 and memory 514 of FIG. 5, while such a processor and memory is explicitly shown as directly controlling the transcription database 500, it is to be appreciated that each of the functional blocks of FIG. 5 may be controlled by and/or implemented by processor 512 and memory 514 or one or more other such processor/memory arrangements.

Figure 6:
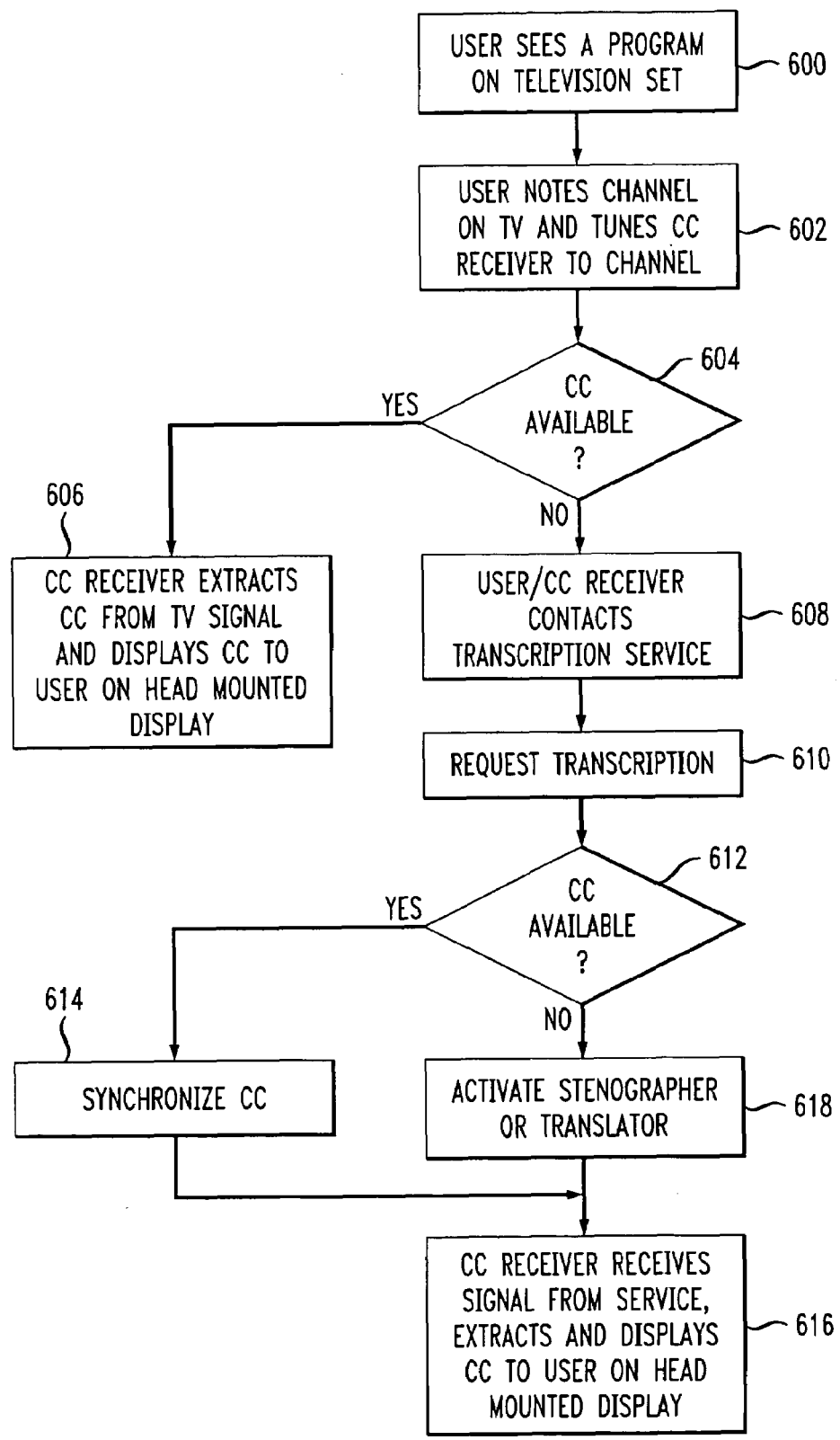
FIG. 6 is a flow diagram illustrating an embodiment of a methodology for portably and universally receiving closed captioning services according to the present invention.

Referring now to FIG. 6, a flow diagram illustrates an embodiment of a methodology for portably and universally receiving closed captioning services according to the present invention. It is to be understood that such methodology may be executed by a closed caption receiving device (e.g., CC receiver 100) and a transcription service (e.g., transcription service system 200 with synchronizer 205) according to the invention. This example illustrates an implementation of the invention in the context of a television program being played on a television set.

Thus, in step 600, the hearing impaired user sees a program on the television set. It is assumed that no closed captioning is seen by the user on the television set. However, even if closed captions are being printed on the television set, the user may still want to receive closed captions on his head mounted display if the user also has a sight impairment. In either case, in step 601, the user notes the channel of the program on the television set (e.g., channel 5) and, using either voice commands or the handheld controller, instructs the CC receiver he is wearing to tune to the noted channel.

In step 604, the CC receiver determines whether closed captioning is available for this program. This may be determined by the option module 401 in FIG. 4. If closed captioning is available, in step 606, the CC receiver extracts the closed captions from the television signal and displays them to the user on the head mounted display. If closed captions are not available, the user and/or the CC receiver contacts the transcription service in step 608. Whether the user or the CC receiver contacts the service is dependent on the system arrangement, as is evident from the illustrative embodiments explained above.

In step 610, a transcription of the program is requested from the service 200 (FIG. 2). Again, depending on the embodiment, this may be done by the user and/or the CC receiver. The transcription service, in step 612, determines if a prestored transcription is available for the program. If so, in step 614, closed captions associated with the transcription are synchronized with the time/sound of the program, as explained above. The closed captioning text data is then transmitted by the service, received by the CC receiver, extracted and displayed on the wearable head mounted display in step 616. If closed captioning is not available (that is, if no prestored transcription is available), the service activates a stenographer or a translator in step 618 to generate a real-time transcription, as explained above. The subsequent stenographic or translated transcription is then transmitted to the CC receiver for extraction and display in step 616.

It is to be appreciated that the above-described methodology may be used as a business model wherein a provider could supply the translation services (106 in FIG. 1) and/or the transcription services (200 in FIG. 2) to which one or more customers obtaining a closed caption receiver (100 in FIG. 1) could subscribe to and then receive.

It is to be appreciated that the closed caption receiving system 100 of the invention may employ the speaker indication techniques disclosed in the U.S. patent application identified by attorney docket no. YOR920000740US1, entitled "Wearable Display System with Indicators of Speakers," filed concurrently herewith, the disclosure of which is incorporated by reference herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of processing a signal wherein at least a portion of the signal includes one or more closed captions representing audio content associated with a program whose visual content is being viewed by a user, the method comprising the steps of:
    obtaining, directly from an originating source, the signal including the one or more closed captions in a portable processing device;
    autonomously processing the signal in the portable processing device so as to generate a display signal representative of the one or more closed captions in the obtained signal; and
    providing the display signal from the portable processing device to a portable display, operatively coupled to the device, for presentation to the user so that the user may view the visual content of the program and view the one or more closed captions in accordance with the portable display;
    wherein the portable processing device further comprises an input controller operatively coupled to the processor for allowing the user to enter one or more instructions to the processing device, and a microphone operatively coupled to the processor for allowing the user to enter one or more voice-based instructions to the processing device:
    and further wherein at least one of the one or more instructions comprises a channel selection instruction.

2. The method of claim 1, wherein the visual content of the program is presented on a content display system and the portable processing device and the portable display are independent of the content display system.

3. The method of claim 2, wherein the content display system is one of a television set, a computer display, and a movie theater screen.

4. The method of claim 1, wherein the closed captions presented to the user on the portable display are substantially synchronized wit the visual content of the program being viewed by the user.

5. The method of claim 1, wherein the obtaining step comprises receiving the signal including the one or more closed captions from a transcription service.

6. The method of claim 5, wherein the transcription service is configured to prestore transcriptions corresponding to audio content associated with programs, generate a signal including one or more closed captions from a requested transcription, and transmit the signal to the portable processing device.

7. The method of claim 5, wherein the transcription service is configured to generate a transcription associated with a program in real-time upon request, generate a signal including one or more closed captions from the real-time transcription, and transmit the signal to the portable processing device.

8. The method of claim 7, wherein the real-time transcription is generated via at least one of a human stenographer, an automatic speech recognition system, and real-time alignment of a prestored transcription.

9. The method of claim 5, wherein the transcription service is configured to provide the closed captions in one or more different languages.

10. The method of claim 1, wherein the obtaining step comprises receiving the signal including the one or more closed captions from a closed caption translation service.

11. The method of claim 10, wherein the obtained signal is a broadcast television signal.

12. The method of claim 11, wherein the visual content of the program is presented on a television set and the broadcast television signal is obtained from the closed caption translation service via redirection from the television set.

13. The method of claim 1, wherein the portable display is a head mounted display system.

14. The method of claim 1, wherein the portable device and the source are in communication via one of a wired link and a wireless link.

15. Apparatus for processing a signal wherein at least a portion of the signal includes one or more closed captions representing audio content associated with a program whose visual content is being viewed by a user, the apparatus comprising:
    a portable processing device including at least one processor operative to: (i) obtain, directly from an originating source, the signal including the one or more closed captions; and (ii) autonomously process the signal so as to generate a display signal representative of the one or more closed captions in the obtained signal; and
    a portable display operatively coupled to the portable processing device and operative to receive and present the display signal to the user so that the user may view the visual content of the program and view the one or more closed captions in accordance with the portable display;
    wherein the portable processing device further comprises an input controller operatively coupled to the processor for allowing the user to enter one or more instructions to the processing device, and a microphone operatively coupled to the processor for allowing the user to enter one or more voice-based instructions to the processing device;
    and further wherein at least one of the one or more instructions comprises a channel selection instruction.

16. The apparatus of claim 15, wherein the visual content of the program is presented on a content display system and the portable processing device and the portable display are independent of the content display system.

17. The apparatus of claim 16, wherein the content display system is one of a television set, a computer display, and a movie theater screen.

18. The apparatus of claim 15, wherein the closed captions presented to the user on the portable display are substantially synchronized with the visual content of the program being viewed by the user.

19. The apparatus of claim 15, wherein the obtaining operation comprises receiving the signal including the one or more closed captions from a transcription service.

20. The apparatus of claim 19, wherein the transcription service is configured to prestore transcriptions corresponding to audio content associated with programs, generate a signal including one or more closed captions from a requested transcription, and transmit the signal to the portable device.

21. The apparatus of claim 19, wherein the transcription service is configured to generate a transcription associated with a program in real-time upon request, generate a signal including one or more closed captions from the real-time transcription, and transmit the signal to the portable device.

22. The apparatus of claim 21, wherein the real-time transcription is generated via at least one of a human stenographer, an automatic speech recognition system, and real-time alignment of a prestored transcription.

23. The apparatus of claim 19, wherein the transcription service is configured to provide the closed captions in one or more different languages.

24. The apparatus of claim 15, wherein the obtaining operation comprises receiving the signal including the one or more closed captions from a closed caption translation service.

25. The apparatus of claim 24, wherein the obtained signal is a broadcast television signal.

26. The apparatus of claim 25, wherein the visual content of the program is presented on a television set and the broadcast television signal is obtained from the closed caption translation service via redirection from the television set.

27. The apparatus of claim 15, wherein the portable display is a head mounted display system.

28. The apparatus of claim 15, wherein the portable processing device and the source are in communication via one of a wired link and a wireless link.

29. The apparatus of claim 28, wherein the portable processing device further comprises a communication module for providing an interface for the communication link.

30. A closed captioning system, comprising:
a closed caption receiver configured to be carried by a user including:
a portable processing device including at least one processor operative to: (i) obtain, directly from an originating closed caption service system, a signal including one or more closed captions representing audio content associated with a program whose visual content is being viewed by the user; and (ii) autonomously process the signal so as to generate a display signal representative of the one or more closed captions in the obtained signal; and
a portable display operatively coupled to the portable processing device and operative to receive and present the display signal to the user so that the user may view the visual content of the program and view the one or more closed captions in accordance with the portable display; and
a closed caption service system, operatively coupled to the closed caption receiver, including at least one processor operative to: (i) generate the signal including the one or more closed captions; and (ii) provide the signal to the closed caption receiver;
wherein the portable processing device further comprises an input controller operatively coupled to the processor for allowing the user to enter one or more instructions to the processing device, and a microphone operatively coupled to the processor for allowing the user to enter one or more voice-based instructions to the processing device:
and further wherein at least one of the one or more instructions comprises a channel selection instruction.

31. The system of claim 30, wherein the visual content of the program is presented on a content display system and the closed caption receiver is independent of the content display system.

32. The system of claim 31, wherein the content display system is one of a television set, a computer display, and a movie theater screen.

33. The system of claim 30, wherein the closed captions presented to the user on the portable display are substantially synchronized, at the closed caption service system, with the visual content of the program being viewed by the user.

34. The system of claim 30, wherein the closed caption service system comprises a transcription service.

35. The system of claim 34, wherein the transcription service is configured to prestore transcriptions corresponding to audio content associated with programs, generate a signal including one or more closed captions from a requested transcription, and transmit the signal to the closed caption receiver.

36. The system of claim 34, wherein the transcription service is configured to generate a transcription associated with a program in real-time upon request, generate a signal including one or more closed captions from the real-time transcription, and transmit the signal to the closed caption receiver.

37. The system of claim 36, wherein the real-time transcription is generated via at least one of a human stenographer, an automatic speech recognition system, and real-time alignment of a prestored transcription.

38. The system of claim 34, wherein the transcription service is configured to provide the closed captions in one or more different languages.

39. The system of claim 30, wherein the closed caption service system comprises a translation service.

40. The system of claim 39, wherein the obtained signal by the closed caption receiver is a broadcast television signal.

41. The system of claim 40, wherein the visual content of the program is presented on a television set and the broadcast television signal is obtained from the translation service by the closed caption receiver via redirection from the television set.

42. The system of claim 30, wherein the portable display is a head mounted display system.

43. The system of claim 30, wherein the closed caption receiver and the closed caption service system are in communication via one of a wired link and a wireless link.

44. The system of claim 43, wherein the portable processing device further comprises a communication module for providing an interface for the communication link.

45. The method of claim 11, wherein the broadcast television signal is selectable with the portable processing device.

46. The method of claim 45, wherein the portable processing device extracts a caption corresponding to the selected broadcast signal.

47. The apparatus of claim 15, wherein the microphone operatively coupled to the processor captures an audio signal, and further wherein the audio signal is transcribed by a remote-transcription service.

48. The method of claim 7, wherein the transcription service synchronizes the one or more closed captions from the real-time transcription through a telephone.

49. The method of claim 4, wherein the step of substantially synchronizing the closed captions comprises the step of hierarchically indexing a playing time of the program.

50. The method of claim 10, wherein the closed caption translation service provides a situational description of the program.

* * * * *

UNITED STATES PATENT AND TRADEMARK OFFICE
CERTIFICATE OF CORRECTION

PATENT NO. : 7,221,405 B2 Page 1 of 1
APPLICATION NO. : 09/774930
DATED : May 22, 2007
INVENTOR(S) : S. H. Basson et al.

It is certified that error appears in the above-identified patent and that said Letters Patent is hereby corrected as shown below:

Claim 4, col. 16, line 3, please delete "wit" and insert -- with --.

Claim 13, col. 16, line 37, please delete "ahead" and insert -- a head --.

Signed and Sealed this

Twenty-fourth Day of July, 2007

JON W. DUDAS
*Director of the United States Patent and Trademark Office*